United States Patent
Takai et al.

(10) Patent No.: US 12,025,980 B2
(45) Date of Patent: Jul. 2, 2024

(54) AUTONOMOUS MOBILE APPARATUS CONTROL SYSTEM, CONTROL METHOD THEREOF, AND CONTROL PROGRAM THEREOF

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Tetsuya Taira, Nagakute (JP); Mikio Honda, Toyota (JP); Shiro Oda, Anjo (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 17/306,007

(22) Filed: May 3, 2021

(65) Prior Publication Data
US 2021/0356960 A1    Nov. 18, 2021

(30) Foreign Application Priority Data
May 15, 2020   (JP) .................. 2020-086172

(51) Int. Cl.
G05D 1/00     (2024.01)
(52) U.S. Cl.
CPC ......... G05D 1/0055 (2013.01); G05D 1/0088 (2013.01); G05D 1/0246 (2013.01); G05D 1/0276 (2013.01)
(58) Field of Classification Search
CPC .. G05D 1/0055; G05D 1/0088; G05D 1/0246; G05D 1/0276; G05D 2201/0211; G05D 1/0282; G05D 2201/0217
See application file for complete search history.

(56) References Cited

U.S. PATENT DOCUMENTS 9,026,301 B2   5/2015  Zini et al.
10,884,411 B1*  1/2021  Allais ................ G06N 3/08
(Continued)

FOREIGN PATENT DOCUMENTS

CN    107688342 A    2/2018
JP    H11-149315 A   6/1999
WO    2019/111859 A1 6/2019

OTHER PUBLICATIONS

IEEE Transactions on industrial electronics, vol. 50, No. 5, Oct. 2003; title: "Controlling mobile robots in distributed intelligent sensor network" by ("Lee") (Year: 2003).*
(Continued)

Primary Examiner — Sohana Tanju Khayer
(74) Attorney, Agent, or Firm — Oliff PLC

(57) ABSTRACT

When an autonomous mobile robot is acquires enters a stuck state in which the autonomous mobile robot cannot autonomosly move, an autonomous mobile apparatus control system according to the present disclosure transmits an autonomous cancel notification for notifying the higher-level management apparatus that the autonomous mobile robot cannot autonomosly move, waits for an operation instruction from the higher-level management apparatus after the transmission of the autonomous cancel notification. The higher-level management apparatus gives an operation instruction to the autonomous mobile robot in response to receiving the autonomous cancel notification based on information acquired from at least one of the plurality of environment cameras. The autonomous mobile robot is configured to resume autonomous driving in response to safety confirmation based on a proximity sensor provided in the autonomous mobile robot after operating in accordance with the operation instruction.

4 Claims, 9 Drawing Sheets

(56) References Cited

U.S. PATENT DOCUMENTS

| | | | |
|---|---|---|---|
| 10,908,615 B2* | 2/2021 | Nishimura | H04N 23/69 |
| 2002/0153184 A1* | 10/2002 | Song | G05D 1/0282 |
| | | | 180/167 |
| 2018/0032081 A1* | 2/2018 | Etoh | G05D 1/0255 |
| 2018/0141427 A1* | 5/2018 | Katayama | B60L 50/60 |
| 2019/0018427 A1* | 1/2019 | Jeon | G05D 1/0214 |
| 2019/0025825 A1* | 1/2019 | Takahama | B60W 50/14 |
| 2019/0039616 A1* | 2/2019 | Leff Yaffe | H04W 4/029 |
| 2019/0061765 A1* | 2/2019 | Marden | B60W 30/18163 |
| 2019/0070730 A1* | 3/2019 | Morioka | B25J 9/1666 |
| 2019/0262993 A1* | 8/2019 | Cole | B25J 9/1676 |
| 2020/0055524 A1* | 2/2020 | Lacaze | G05D 1/0088 |
| 2020/0291614 A1* | 9/2020 | Kiyota | E02F 9/261 |
| 2021/0078173 A1 | 3/2021 | Zhou et al. | |
| 2021/0114620 A1* | 4/2021 | Yu | B60W 30/162 |
| 2022/0047142 A1* | 2/2022 | Han | A47L 5/225 |

OTHER PUBLICATIONS

J. Lee et al: "Controlling mobile robots in distributed intelligent sensor network", IEEE Transactions on Industrial Electronics, IEEE Service Center, Piscataway, NJ, USA, vol. 50, No. 5, pp. 890-902 issued on Oct. 1, 2003.

* cited by examiner

AUTONOMOUS MOBILE APPARATUS CONTROL SYSTEM, CONTROL METHOD THEREOF, AND CONTROL PROGRAM THEREOF

CROSS REFERENCE TO RELATED APPLICATIONS

This application is based upon and claims the benefit of priority from Japanese patent application No. 2020-086172, filed on May 15, 2020, the disclosure of which is incorporated herein in its entirety by reference.

BACKGROUND

The present disclosure relates to an autonomous mobile apparatus control system, a control method thereof, and a control program thereof.

Advances in the development of autonomous mobile apparatuses which autonomously move inside predetermined buildings and facilities has been made. Such an autonomous mobile apparatus may be an automatic delivery apparatus including a carrier or pulling a truck to automatically deliver a package. The automatic delivery apparatus can deliver, for example, a package loaded at a departure place to a destination by autonomously moving from the departure place to the destination.

For example, the automatic delivery apparatus described in U.S. Pat. No. 9,026,301 includes a tug and a cart that can autonomously move. A computer included in the automatic delivery apparatus stores an electronic map of a floor plan of a building and a path to be followed when the automatic delivery apparatus moves from one location to the next. The automatic delivery apparatus transports various articles using different types of loading platform parts according to the purpose.

SUMMARY

However, in a transport robot, for example, an emergency stop operation is performed by pressing an emergency stop button for forcibly stopping the operation, or an emergency stop operation is performed to avoid contact with a person or an obstacle, and the autonomous drive state is canceled. When such an emergency stop operation is performed, there is no disclosure in U.S. Pat. No. 9,026,301 about how to recover the autonomous drive state of the transport robot.

The present disclosure has been made to solve such a problem. An object of the present disclosure is to safely recover a robot to the autonomous drive state from an emergency stop state.

An example aspect of the present disclosure is an autonomous mobile apparatus control system including: an autonomous mobile robot; a higher-level management apparatus configured to manage the autonomous mobile robot; and a plurality of environment cameras configured to photograph a moving range of the autonomous mobile robot and transmit a photographed image to the higher-level management apparatus. The autonomous mobile robot is configured to: acquire a movement target position from the higher-level management apparatus; and autonomously move toward the movement target position; when the autonomous mobile robot enters a stuck state in which the autonomous mobile robot cannot autonomosly move, transmit an autonomous cancel notification for notifying the higher-level management apparatus that the autonomous mobile robot cannot autonomosly move; and wait for an operation instruction from the higher-level management apparatus after the transmission of the autonomous cancel notification. The higher-level management apparatus is configured to give an operation instruction to the autonomous mobile robot in response to receiving the autonomous cancel notification based on information acquired from at least one of the plurality of environment cameras, and the autonomous mobile robot is configured to resume autonomous driving in response to safety confirmation based on a proximity sensor provided in the autonomous mobile robot after operating in accordance with the operation instruction.

Another example aspect of the present disclosure is a method of controlling an autonomous mobile apparatus control system including: an autonomous mobile robot; a higher-level management apparatus configured to manage the autonomous mobile robot; and a plurality of environment cameras configured to photograph a moving range of the autonomous mobile robot and transmit a photographed image to the higher-level management apparatus. The method includes: controlling the autonomous mobile robot to acquire a movement target position from the higher-level management apparatus, and autonomously move toward the movement target position; when the autonomous mobile robot enters a stuck state in which the autonomous mobile robot cannot autonomosly move, controlling the autonomous mobile robot to transmit an autonomous cancel notification for notifying the higher-level management apparatus that the autonomous mobile robot cannot autonomosly move; controlling the autonomous mobile robot to wait for an operation instruction from the higher-level management apparatus after the transmission of the autonomous cancel notification; controlling the higher-level management apparatus to give an operation instruction to the autonomous mobile robot in response to receiving the autonomous cancel notification based on information acquired from at least one of the plurality of environment cameras; and controlling the autonomous mobile robot to resume autonomous driving in response to safety confirmation based on a proximity sensor provided in the autonomous mobile robot after controlling the autonomous mobile robot to operate in accordance with the operation instruction.

Another example aspect of the present disclosure is a control program of an autonomous mobile robot executed by a higher-level management apparatus in an autonomous mobile apparatus control system including: an autonomous mobile robot; a higher-level management apparatus configured to manage the autonomous mobile robot; and a plurality of environment cameras configured to photograph a moving range of the autonomous mobile robot and transmit a photographed image to the higher-level management apparatus. The control program: causes the autonomous mobile robot to acquire a movement target position from the higher-level management apparatus, and autonomously move toward the movement target position; when the autonomous mobile robot enters a stuck state in which the autonomous mobile robot cannot autonomosly move, causes the higher-level management apparatus to receive an autonomous cancel notification for notifying the higher-level management apparatus that the autonomous mobile robot cannot autonomosly move; gives an operation instruction to the autonomous mobile robot in response to receiving the autonomous cancel notification based on information acquired from at least one of the plurality of environment cameras; and controls the autonomous mobile robot to resume autonomous driving in response to safety confirmation based on a proximity sensor provided in the autonomous mobile robot after controlling the autonomous mobile robot to operate in accordance with the operation instruction.

In the autonomous mobile apparatus control system, the control method thereof, and the control program thereof according to the present disclosure, after the stuck state occurs, the higher-level management apparatus gives an initial operation instruction based on the surrounding environment of the autonomous mobile robot, and after confirming that no safety error occurs, the autonomous mobile robot can be recovered to the autonomous drive mode.

According to the present disclosure, it is possible to provide an autonomous mobile apparatus control system, a control method thereof, and a control program thereof that can safely recover an autonomous mobile robot to an autonomous drive state from a stuck state.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
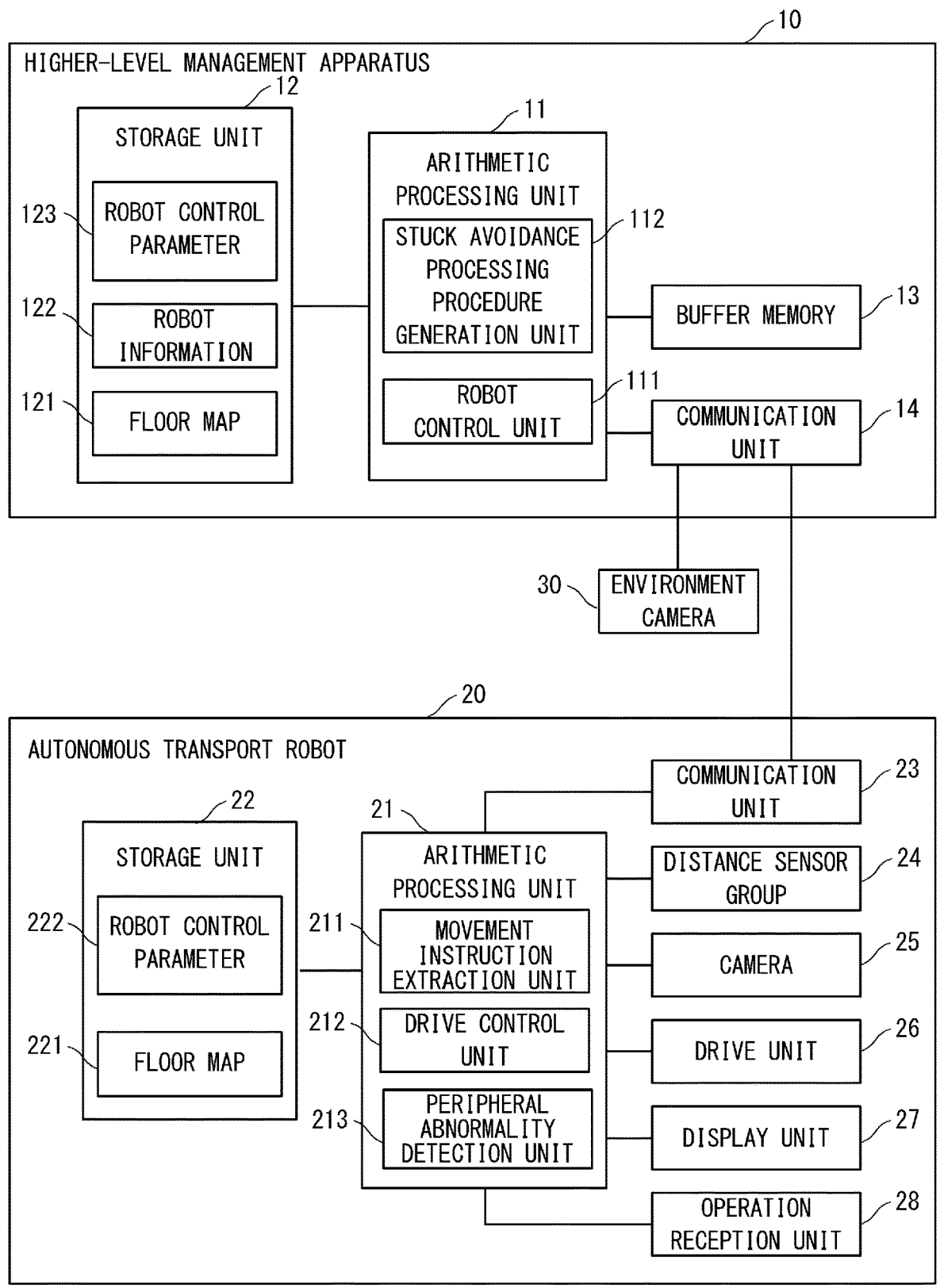
FIG. 1 is a block diagram of an autonomous mobile apparatus control system according to a first embodiment.

For clarity of explanation, the following descriptions and drawings have been omitted and simplified as appropriate. Further, each element described in the drawing as a functional block for performing various processes can be composed of a CPU (Central Processing Unit), a memory, or other circuit in terms of hardware, and is implemented by a program loaded into the memory in terms of software. It will thus be understood by those skilled in the art that these functional blocks may be implemented in a variety of ways, either hardware only, software only, or a combination thereof. In the drawings, the same elements are denoted by the same reference signs, and repeated description is omitted if necessary.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Embodiment

FIG. 1 is a block diagram of an autonomous mobile apparatus control system 1 according to a first embodiment of the present disclosure. As shown in FIG. 1, the autonomous mobile apparatus control system 1 according to the first embodiment includes a higher-level management apparatus 10, an autonomous mobile robot (e.g., the autonomous transport robot 20), and an environment camera 30. In FIG. 1, one each of the autonomous transport robot 20 and the environment camera 30 is shown, but there are actually a plurality of the autonomous transport robots 20 and the environment cameras 30. The autonomous mobile apparatus control system 1 efficiently controls the plurality of autonomous transport robots 20 while controlling the autonomous transport robots 20 to autonomously move within a predetermined facility. Therefore, in the autonomous mobile apparatus control system 1, the plurality of environment cameras 30 are installed in the facility to acquire images in a range where the autonomous transport robots 20 move. In the autonomous mobile apparatus control system 1, it is assumed that images acquired by the plurality of environment cameras 30 are collected by the higher-level management apparatus 10.

In the autonomous mobile apparatus control system 1 according to the first embodiment, the higher-level management apparatus 10 instructs the autonomous transport robot 20 to move to a destination, and the autonomous transport robot 20 then moves autonomously toward the destination designated by the higher-level management apparatus 10. At this time, in the autonomous mobile apparatus control system 1 according to the first embodiment, the autonomous transport robot 20 autonomously moves toward the destination using sensors provided in the autonomous mobile robot 20, a floor map, position information, and the like. The higher-level management apparatus 10 uses the environment cameras 30 to perform safety management of the operations of the autonomous transport robots 20 and stuck avoidance processing when the autonomous transport robot 20 is in the stuck state.

The higher-level management apparatus 10 includes an arithmetic processing unit 11, a storage unit 12, a buffer memory 13, and a communication unit 14. The arithmetic processing unit 11 performs arithmetic operations for controlling and managing the autonomous transport robots 20. Although FIG. 1 shows only the characteristic parts of the arithmetic processing unit 11, which are a robot control unit 111 and a stuck avoidance processing procedure generation unit 112, other processing blocks are also included in the arithmetic processing unit 11.

The robot control unit 111 performs calculation for remotely operating the autonomous transport robots 20, and generates specific operation instructions for the autonomous transport robots 20. The stuck avoidance processing procedure generation unit 112 generates a stuck avoidance procedure for recovering the autonomous transport robot 20 from the stuck state based on the images acquired from the environment cameras 30 when the autonomous transport robot 20 is in the stuck state. This stuck avoidance procedure indicates the order, direction, and amount of movement of the autonomous transport robot 20 in the stuck state.

The storage unit 12 stores information necessary for the management and control of the robots. In the example of FIG. 1, a floor map 121, robot information 122, and a robot control parameter 123 are shown. Information other than those items may be stored in the storage unit 12. In the arithmetic processing unit 11, the robot control unit 111 or the like performs arithmetic operations using the information stored in the storage unit 12.

The floor map 121 is map information of a facility in which the autonomous transport robots 20 move. The floor map 121 may be created in advance, may be generated from information acquired from the autonomous transport robot 20, or may be a basic map created in advance added with map correction information generated from the information acquired from the autonomous transport robot 20.

The robot information 122 describes the model number and specifications of the autonomous transport robot 10 managed by the higher-level management apparatus 20. The robot control parameter 123 describes a control parameter such as distance threshold information about a distance between each of the autonomous transport robots 10 managed by the higher-level management apparatus 20 and an obstacle.

The buffer memory 13 stores intermediate information generated in processing in the arithmetic processing unit 11. The communication unit 14 is a communication interface for communicating with the plurality of environment cameras 30 and at least one autonomous transport robot 20 provided in the facility where the autonomous mobile apparatus control system 1 is used. The communication unit 14 can perform both wired communication and wireless communication.

The autonomous transport robot 20 includes an arithmetic processing unit 21, a storage unit 22, a communication unit 23, a proximity sensor (e.g., a distance sensor group 24), a camera 25, a drive unit 26, a display unit 27, and an operation reception unit 28. In FIG. 1, only representative processing blocks provided in the autonomous transport robot 20 are shown, but the autonomous transport robot 20 includes many other processing blocks not shown.

The communication unit 23 is a communication interface for communicating with the communication unit 10 of the higher-level management apparatus 14. The communication unit 23 communicates with the communication unit 14 using, for example, radio signals. The distance sensor group 24 is, for example, a proximity sensor, and outputs proximity distance information indicating a distance to an object or a person present around the autonomous transport robot 20. The camera 25, for example, photographs images for recognizing the surrounding situation of the autonomous transport robot 20. The camera 25 can also photograph, for example, a position marker provided on the ceiling of the facility or the like. In the autonomous mobile apparatus control system 1 according to the first embodiment, the position marker is used to make the autonomous transport robot 20 recognize the position of itself. The drive unit 26 drives driving wheels provided in the autonomous transport robot 20. The display unit 27 displays a user interface screen to be an operation reception unit 28. The display unit 27 may display information indicating the destination of the autonomous transport robot 20 and the state of the autonomous transport robot 20. The operation reception unit 28 includes, in addition to the user interface screen displayed on the display unit 27, various switches provided in the autonomous transport robot 20. The various switches include, for example, an emergency stop button.

The arithmetic processing unit 21 performs arithmetic operations used for controlling the autonomous transport robot 20. More specifically, the arithmetic processing unit 21 includes a movement instruction extraction unit 211, a drive control unit 212, and a peripheral abnormality detection unit 213. In FIG. 1, only representative processing blocks of the arithmetic processing unit 21 are shown, but the arithmetic processing unit 21 includes other processing blocks not shown.

The movement instruction extraction unit 211 extracts a moving instruction from a control signal supplied from the higher-level management apparatus 10 and supplies it to the drive control unit 212. The drive control unit 212 controls the drive unit 211 so as to move the autonomous transport robot 20 at the speed and direction indicated by the movement instruction given from the movement instruction extraction unit 26. When the drive control unit 212 receives an emergency stop signal from the emergency stop button included in the operation reception unit 28, the drive control unit 212 stops the operation of the autonomous transport robot 20 and gives an instruction to the drive unit 26 not to generate a drive force. The peripheral abnormality detection unit 213 detects an abnormality generated in the periphery of the autonomous transport robot 24 based on information acquired from the distance sensor group 20 or the like, and gives a stop signal for stopping the autonomous transport robot 20 to the drive control unit 212. The drive control unit 212, which has received the stop signal, gives an instruction to the drive unit 26 not to generate the drive force.

The storage unit 22 stores a floor map 221 and a robot control parameter 222. FIG. 1 shows a part of the information stored in the storage unit 22, and includes information other than the floor map 221 and the robot control parameter 222 shown in FIG. 1. The floor map 221 is map information of the facility in which the autonomous transport robots 20 move. The floor map 221 is acquired, for example, by downloading the floor map 10 of the higher-level management apparatus 121. The floor map 221 may be created in advance. The robot control parameter 222 is a parameter for operating the autonomous transport robot 20, and includes, for example, an operation limit threshold of the distance to an obstacle or a person for stopping or limiting the operation of the autonomous transport robot 20.

The drive control unit 212 refers to the robot control parameter 222 and stops the operation or limits the operation speed when the distance indicated by the distance information acquired from the distance sensor group 24 falls below the operation limit threshold.

Figure 2:
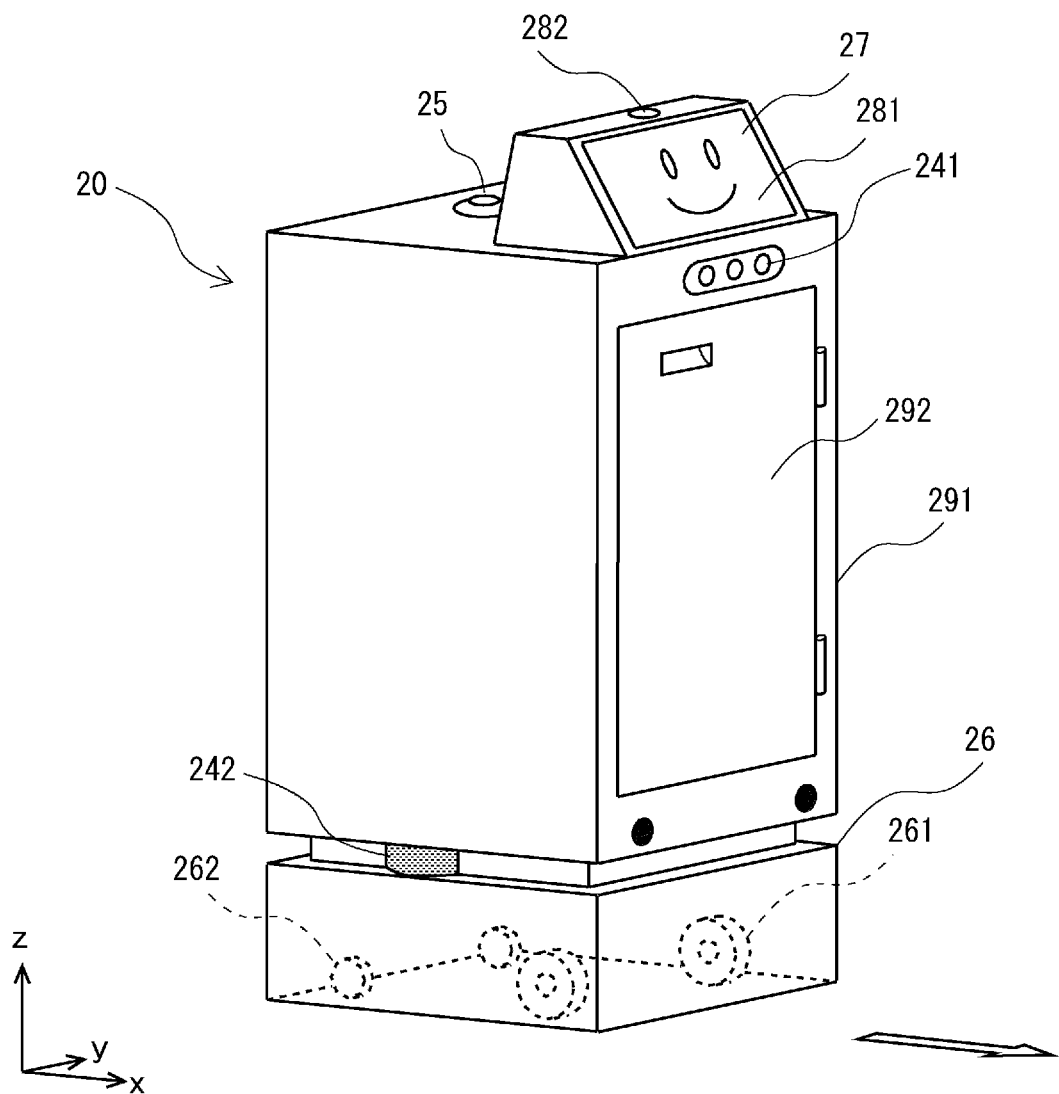
FIG. 2 is a schematic diagram of an autonomous mobile robot according to the first embodiment.

The external appearance of the autonomous transport robot 20 will now be described. FIG. 2 is a schematic diagram of the autonomous transport robot 20 according to the first embodiment. The autonomous transport robot 20 shown in FIG. 2 is one of the forms of the autonomous transport robot 20, and may have a different form.

An example shown in FIG. 2 is the autonomous transport robot 20 including a storage 291 and a door 292 for sealing the storage 291. The autonomous transport robot 20 transports, by the autonomous movement, the stored object stored in the storage 291 to the destination instructed from the higher-level management apparatus 10. In FIG. 2, the x direction is the forward and backward direction of the autonomous transport robot 20, the y direction is the lateral direction of the autonomous transport robot 20, and the z direction is the height direction of the autonomous transport robot 20.

As shown in FIG. 2, the autonomous transport robot 20 according to the first embodiment includes a front-rear distance sensor 241 and a left-right distance sensor 242 as the distance sensor group 24 on its exterior. In the autonomous transport robot 20 according to the first embodiment, the front-rear distance sensor 241 measures a distance to an object or a person in the front-rear direction of the autonomous transport robot 20. In the autonomous transport robot 20 according to the first embodiment, the left-right distance sensor 242 measures the distance to an object or a person in the lateral direction of the autonomous transport robot 20.

In the autonomous transport robot 20 according to the first embodiment, a drive unit 26 is provided below the storage 291. The drive unit 26 is provided with driving wheels 261 and casters 262. The driving wheels 261 move the autonomous transport robot 20 back and forth, left and right. The casters 262 are driven wheels to which no drive force is applied and which follow the driving wheels 261 by rolling.

In the autonomous transport robot 20, a display unit 27, an operation interface 281, and a camera 25 are provided on the upper surface of the storage 291. The display unit 27 displays the operation reception unit 28 and the operation interface 281. An emergency stop button 282 is provided on the upper surface of the display unit 27.

Next, the operation of the autonomous mobile apparatus control system 1 according to the first embodiment will be described. One of the features of the autonomous mobile apparatus control system 1 according to the first embodiment is an operation thereof when the autonomous transport robot 20 is in a stuck state in which the autonomous transport robot 20 cannot autonomously move. Therefore, in the following description, as an operation example of the autonomous transport robot 20, an operation example of the autonomous mobile apparatus control system 1 in which the stuck state of the autonomous transport robot 20 occurs will be described.

Figure 3:
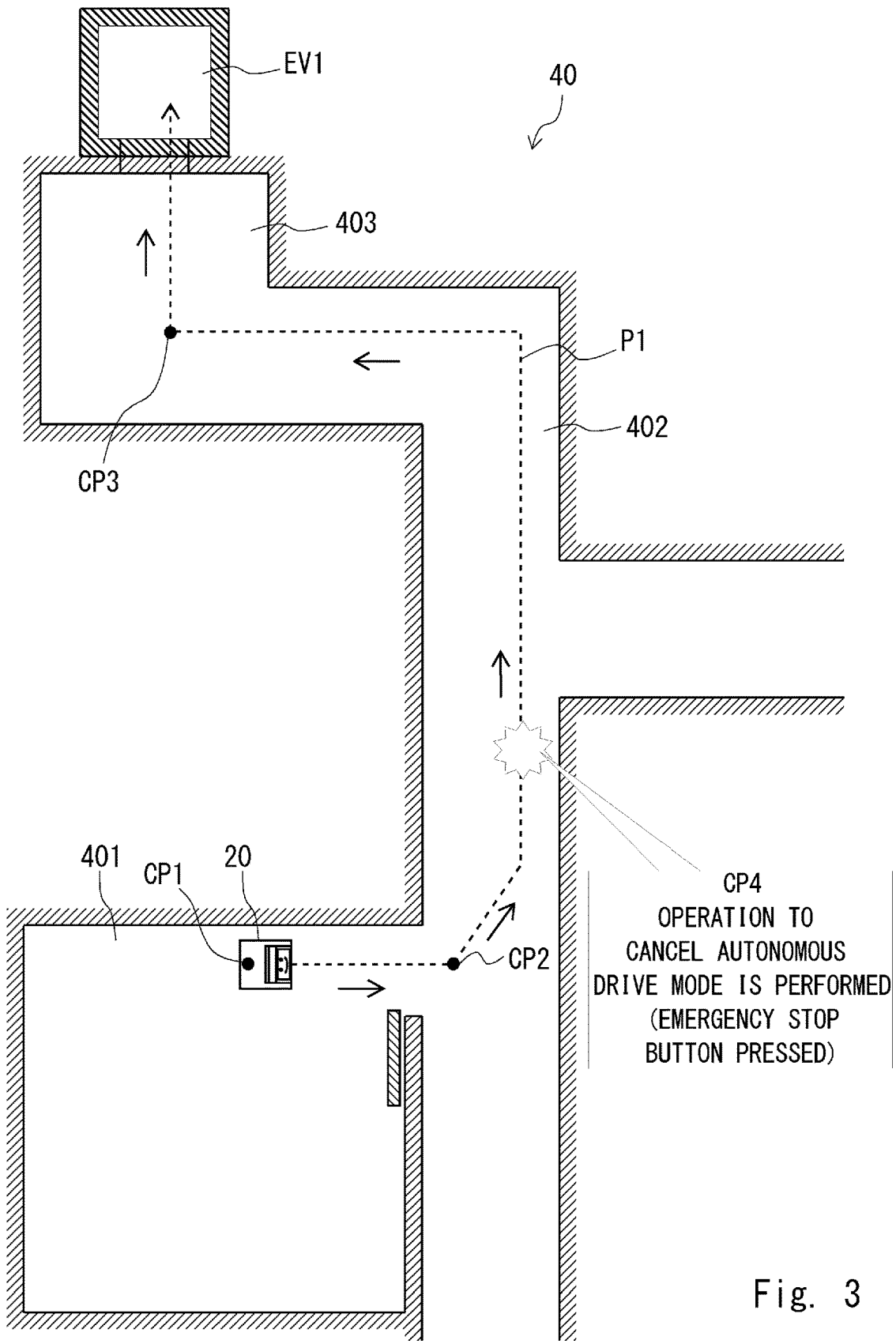
FIG. 3 is a diagram for explaining a state in which a stuck state occurs in the autonomous mobile apparatus control system according to the first embodiment.

As one operation example of the autonomous transport robot 20, FIG. 3 is a diagram for explaining the state in which the stuck state occurs in the autonomous mobile apparatus control system 1 according to the first embodiment. FIG. 3 shows a part of the facility 40, and shows a room 401, a corridor 401 connecting the room 402, an elevator EV1 provided at the end of the corridor 402, and an elevator hall 403 provided in front of the elevator EV1.

In the example shown in FIG. 3, the autonomous transport robot 20 starts from a starting point CP1 in the room 401 and moves along a path P1 by passing through the corridor 402 and the elevator hall 403 to reach the elevator EV1. In the example shown in FIG. 3, an autonomous drive mode of the autonomous transport robot 20 is canceled, because the emergency stop button 282 is pressed while the autonomous transport robot 20 is moving from a relay point CP2 to a relay point CP3 on the path P1. In FIG. 3, the point where the emergency stop button 282 is pressed is shown as a stop point CP4.

When the autonomous transport robot 20 moves along the path P1 shown in FIG. 3 and stops in response to the pressing of the emergency stop button 282 at the stop point CP4, the autonomous transport robot 20 enters a stuck state in which the autonomous transport robot 20 cannot autonomously move by the autonomous transport robot 20 alone in the autonomous mobile apparatus control system 1 according to the first embodiment. When such a stuck state occurs, in the autonomous mobile apparatus control system 1 according to the first embodiment, the autonomous transport robot 20 is recovered from the stuck state to the autonomous mobile state based on an instruction from the higher-level management apparatus 10. The operation of the autonomous mobile apparatus control system 1 that performs such an operation will be described below.

Figure 4:
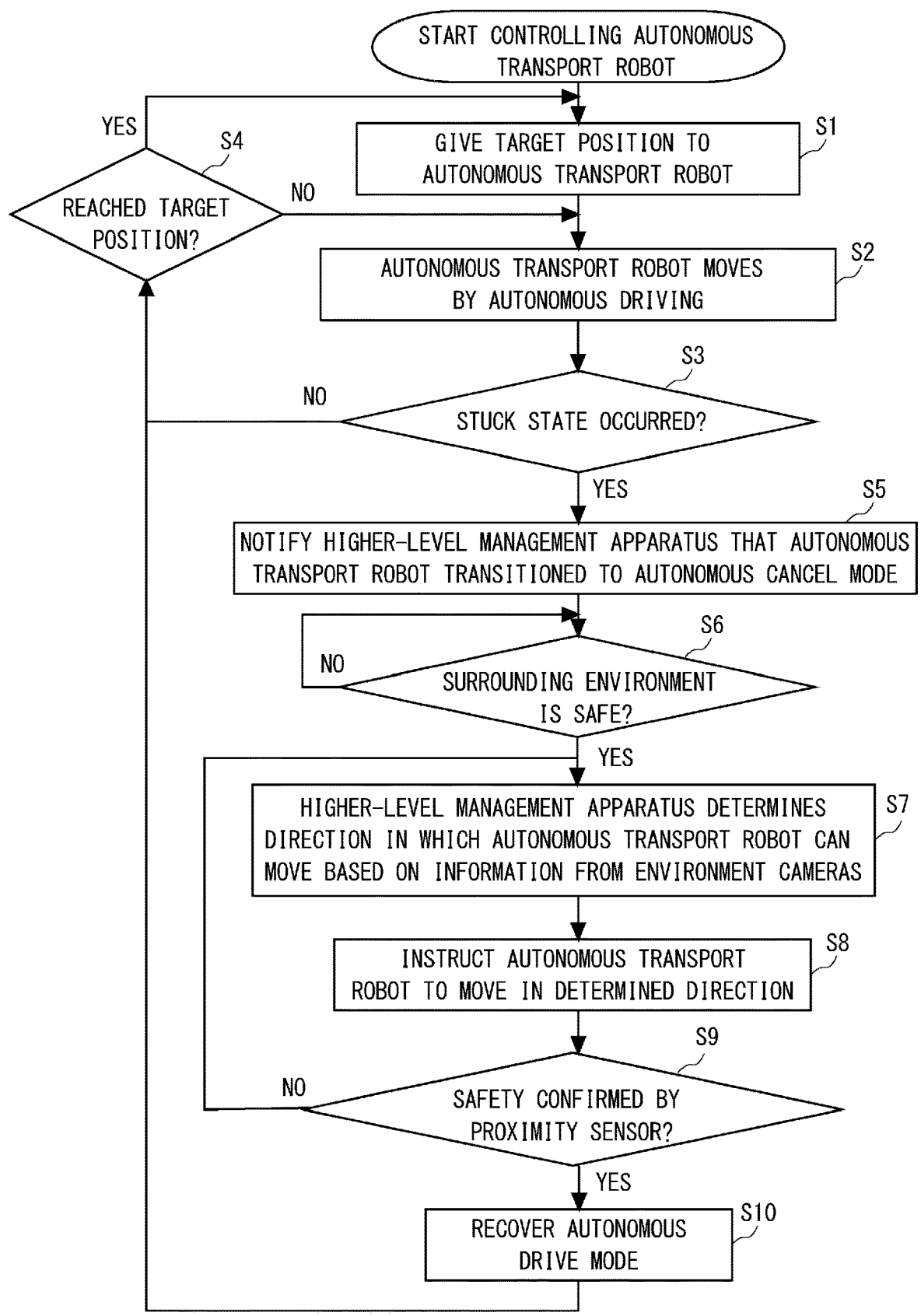
FIG. 4 is a flowchart for explaining an operation of the autonomous mobile apparatus control system according to the first embodiment.

FIG. 4 is a flowchart for explaining the operation of the autonomous mobile apparatus control system according to the first embodiment. As shown in FIG. 4, in the autonomous mobile apparatus control system 1 according to the first embodiment, when the control of the autonomous transport robot 20 is started, first, the higher-level management apparatus 10 gives a target position (e.g., the destination and relay point) to the autonomous transport robot 20 (Step S1). Then, the autonomous transport robot 20 moves toward the destination by autonomous driving (Steps S2, S3, and S4 are repeatedly executed).

For example, when the emergency stop button 282 of the autonomous transport robot 20 is pressed during the movement to cause the autonomous transport robot 20 to enter the stuck state (YES branch of Step S3), the autonomous transport robot 20 transmits an autonomous cancel notification to notify the higher-level management apparatus 10 that the autonomous transport robot 20 has transitioned to an autonomous cancel mode (Step S5).

Upon receiving the autonomous cancel notification, the higher-level management apparatus 10 uses the environment cameras 30 to acquire images of the surrounding environment of the autonomous transport robot 20 in the stuck state. Based on the acquired images, the stuck avoidance processing procedure generation unit 112 of the higher-level management apparatus 10 confirms whether or not the surrounding environment of the autonomous transport robot 20 is safe (Step S6). In Step S6, it is determined whether or not there is an obstacle or a person within a predetermined range around the autonomous transport robot 20 in the stuck state. If it is confirmed in Step S6 that a safe state in which there are no obstacles or persons is not ensured in the predetermined range around the autonomous transport robot 20, the higher-level management apparatus 10 waits until the safe state is ensured before giving an instruction to the autonomous transport robot 20 (NO branch of Step S6). On the other hand, if it is confirmed in Step S6 that the safe state of the predetermined range around the autonomous transport robot 20 is ensured (YES branch of Step S6), the higher-level management apparatus 10 determines the direction in which the autonomous transport robot 30 can move based on the images acquired from the environment cameras 20 (Step S7). The higher-level management apparatus 10 transmits an operation instruction for instructing the autonomous transport robot 20 to move in the determined direction based on the determination in Step S7 (Step S8). Note that the processing of Step S7 is performed by the stuck avoidance processing procedure generation unit 112, and the processing of Step S8 is performed by the robot control unit 111 based on the determination result of the stuck avoidance processing procedure generation unit 112.

Then, in Step S8, the autonomous transport robot 20, which has received the operation instruction from the higher-level management apparatus 10, confirms the safety of its surroundings using the distance sensor group 24 (Step S9). In Step S9, if the safety is not confirmed (NO branch of Step S9), the autonomous transport robot 20 again requests the higher-level management apparatus 10 to confirm the safety and to instruct the moving direction. On the other hand, if the safety is confirmed in Step S9 (YES branch of Step S9), the autonomous transport robot 20 starts moving in the moving direction given in Step S8, and recovers the autonomous transport robot 20 to the autonomous drive mode to move by autonomous driving (Step S10). After recovering to the autonomous drive mode, the autonomous transport robot 20 repeats the operations of Steps S2 to S4 to reach the destination.

From the above description, in the autonomous mobile apparatus control system 1 according to the first embodiment, when the autonomous transport robot 20 transitions from the autonomous drive mode to the autonomous cancel mode for some reason, the autonomous transport robot 20 is recovered to the autonomous drive mode based on the instruction from the higher-level management apparatus 10. Thus, in the autonomous mobile apparatus control system 1 according to the first embodiment, the autonomous transport robot 20 can be safely recovered from the autonomous cancel mode to the autonomous drive mode.

For example, it can be considered that persons and the autonomous transport robots 20 coexist in a facility. In such a case, when an emergency occurs, a person(s) around the autonomous transport robot 20 may press the emergency stop button 282, and the autonomous transport robot 20 may be set to the autonomous cancel mode. In such a case, the safety may be insufficient if only the safety within the detectable range is confirmed by the distance sensor group 20 of the autonomous transport robot 24. Even in such a case, in the autonomous mobile apparatus control system 1, the safety in a range wider than the detectable range of the distance sensor group 24 of the autonomous transport robot 20 is confirmed using the environment cameras 30, and the initial moving direction in the autonomous operation mode is given. By doing so, it is possible to more safely recover the autonomous transport robot 20 to the autonomous drive mode.

Second Embodiment

In a second embodiment, another form of the method for recovering from the autonomous cancel mode to the autonomous drive mode will be described. In the description of the second embodiment, components described in the first embodiment are denoted by the same reference signs as those in the first embodiment, and description of those components is omitted.

In the second embodiment, the autonomous transport robot 20 determines a recover procedure for recovering the autonomous transport robot 20 from the stuck state to the autonomous drive state. At this time, in the second embodiment, the autonomous transport robot 20 determines the recover procedure based on environmental information including the images of the surrounding envrionment of the autonomous transport robot 20 acquired from the higher-level management apparatus 10.

In the second embodiment, it is assumed that the autonomous transport robot 20 alone cannot recover from the stuck state to the autonomous drive state when the safety function of the autonomous transport robot 20 using the distance sensor group 24 is effective in the stuck state.

Figure 5:
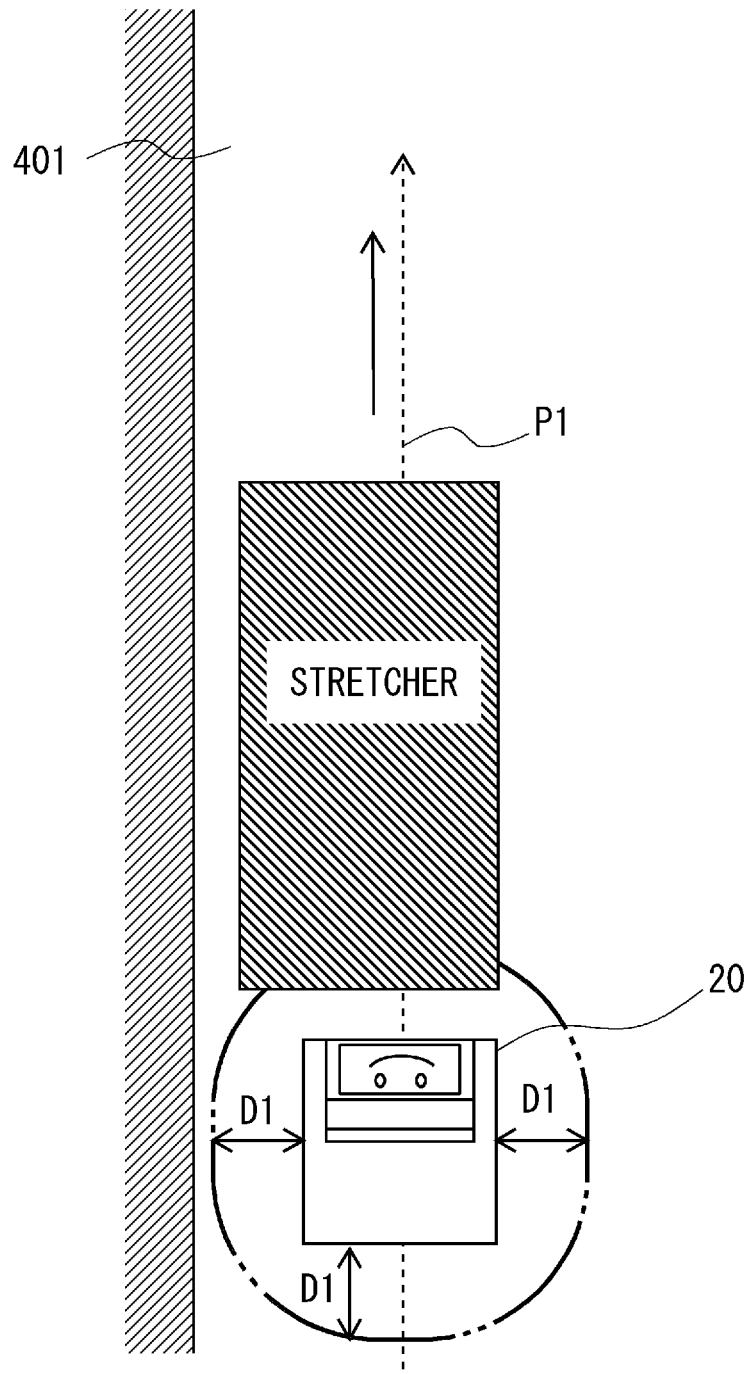
FIG. 5 is a diagram for explaining a first example of a state in which the stuck state occurs in an autonomous mobile apparatus control system according to a second embodiment.
Figure 6:
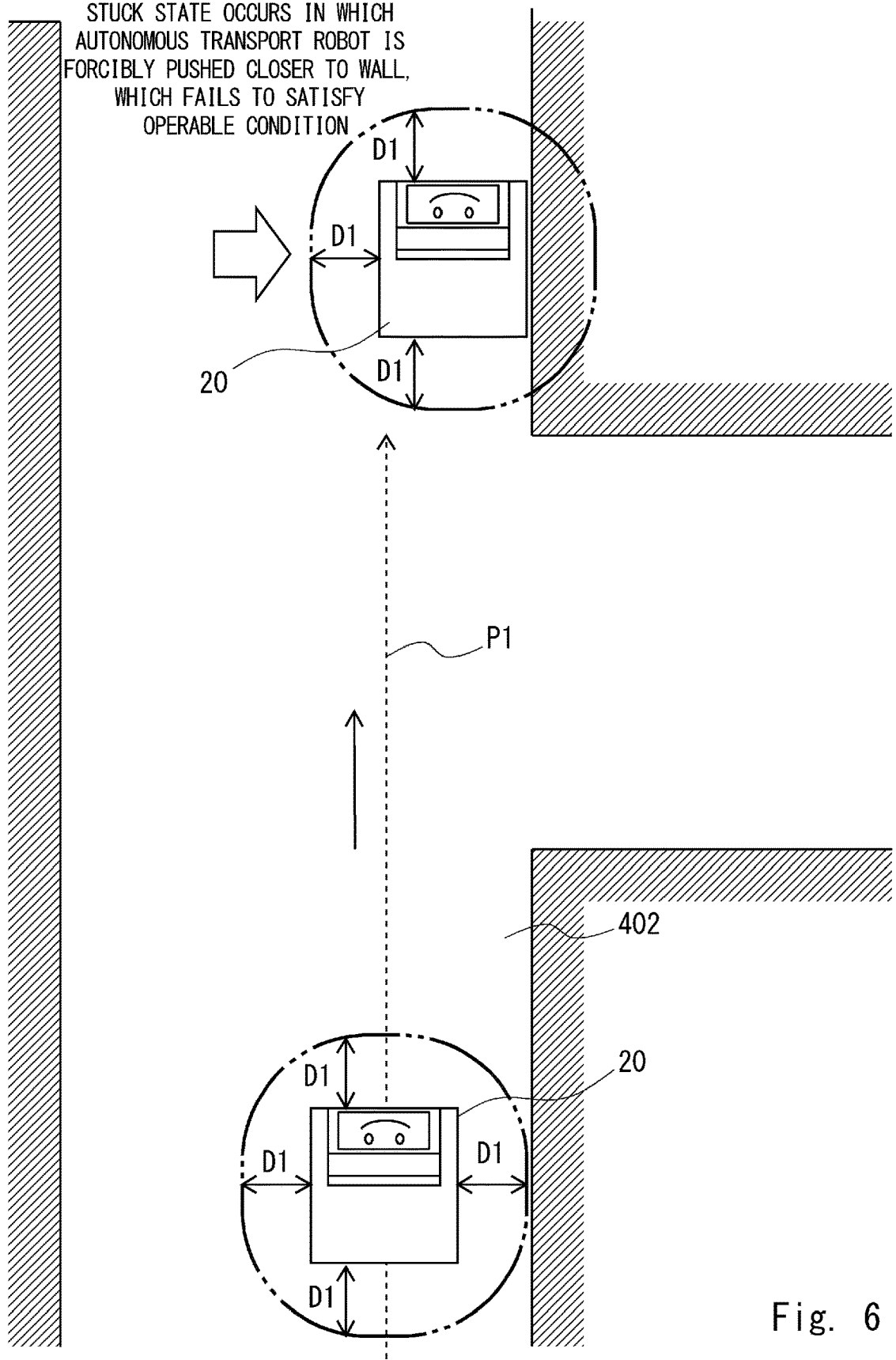
FIG. 6 is a diagram for explaining a second example of a state in which the stuck state occurs in the autonomous mobile apparatus control system according to the second embodiment.

Therefore, in the autonomous mobile apparatus control system according to the second embodiment, the assumed stuck state will be described with reference to FIGS. 5 and 6. FIG. 5 is a diagram for explaining a first example when the stuck state occurs in the autonomous mobile apparatus control system according to the second embodiment. FIG. 6 is a diagram for explaining a second example when the stuck state occurs in the autonomous mobile apparatus control system according to the second embodiment. FIG. 5 shows an example of the stuck state occurring in the room 401 of FIG. 3. FIG. 6 shows an example of the stuck state occurring in the corridor 402 of FIG. 3. Further, in FIGS. 5 and 6, as an area in which the autonomous transport robot 20 ensures safety, the range of a distance D1 from the autonomous transport robot 20 is defined as a safety securing range. When a person or an object is present in the safety securing range, the autonomous transport robot 20 enters the autonomous cancel mode in which the operation is stopped.

The first example shown in FIG. 5 shows a state in which a stretcher is placed in the vicinity of the autonomous transport robot 20 while the autonomous transport robot 20 is stopped at the starting point CP1. In the first example, since the stretcher is placed within the safety range of the autonomous transport robot 20, even if the autonomous transport robot 20 tries to move to another place, the autonomous transport robot 20 cannot enter the autonomous drive mode, and the stuck state occurs.

In the second example shown in FIG. 6, the stuck state that occurs while the autonomous transport robot 20 travels along the path P1 from the relay point CP2 to the relay point CP3 will be described. When the emergency stop button 282 is pressed, the autonomous transport robot 20 enters the autonomous cancel mode, and the supply of the drive force to the driving wheels 261 is cut off, so that a person can freely move the autonomous transport robot 20. Therefore, the second example shows the state in which the autonomous transport robot 20, which has entered the autonomous cancel mode due to the emergency stop button 282 being pressed, is forcibly pushed closer to the wall. Also in the second example, the wall falls within the safety range of the autonomous transport robot 20 during the autonomous cancel mode, so that the autonomous transport robot 20 cannot enter the autonomous drive mode, and the stuck state occurs.

Figure 7:
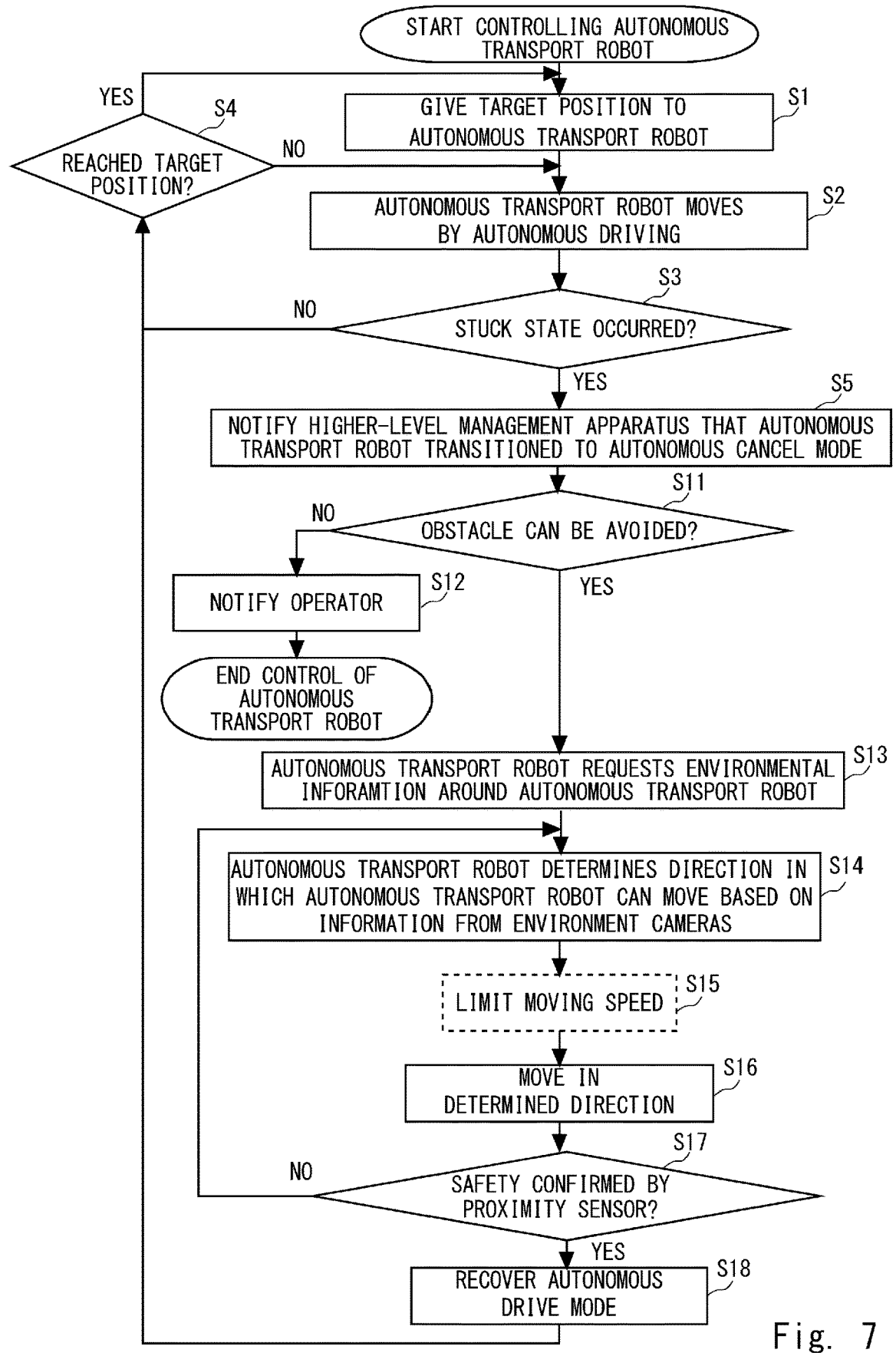
FIG. 7 is a flowchart for explaining an operation of the autonomous mobile apparatus control system according to the second embodiment.

In the second embodiment, the operation of the autonomous mobile apparatus control system according to the second embodiment including the process for recovering from the stuck state to the autonomous drive mode as shown in FIGS. 5 and 6 will be described. FIG. 7 is a flowchart for explaining the operation of the autonomous mobile apparatus control system according to the second embodiment.

As shown in FIG. 7, the operation of the autonomous mobile apparatus control system according to the second embodiment is different from that according to the first embodiment in the processing in Step S5 from the processing of transmitting the autonomous cancel notification about the autonomous transport robot 20 being transitioned to the autonomous cancel mode to the higher-level management apparatus 10.

In the second embodiment, the higher-level management apparatus 10, which has received the autonomous cancel notification in Step S5, uses the environment cameras 30 to recognize the situation around the autonomous transport robot 20 in the stuck state, and determines whether the autonomous transport robot 20 can avoid an obstacle that caused the stuck state (Step S11). In the determination in Step S11, for example, when the obstacle is a mobile body, a determination may be made to wait for the mobile body to pass and then recover the autonomous transport robot 20 to the autonomous drive mode. Further, in the determination in Step S11, for example, if it is determined that it is impossible to avoid the obstacle, for example, when a path that the autonomous transport robot 20 can move cannot be found around the autonomous transport robot 20 (NO branch of Step S11), the higher-level management apparatus 10 notifies an operator of this determination (Step S12), and ends the control of the autonomous transport robot 20 in the stuck state.

On the other hand, if it is determined in Step S11 that the autonomous transport robot 20 can avoid the obstacle (YES branch of Step S11), the higher-level management apparatus 10 notifies the autonomous transport robot 20 of the determination, and the autonomous transport robot 20 requests the environmental information around the autonomous transport robot 20 to the higher-level management apparatus 10 in response to the notification (Step S13). The environmental information includes image information which is photographed by the environment cameras 30 and enables recognition of the situation around the autonomous transport robot 20.

The autonomous transport robot 20 determines the direction in which the autonomous transport robot 20 can move based on the acquired environmental information (Step S14). The autonomous transport robot 20 starts moving in the direction determined in Step S14 (Step S16), and invalidates the distance sensor group 24 or relaxes an operation limit threshold condition for the detection result acquired from the distance sensor group 24 until there is no obstacle in the safety range set based on the distance D1. In the example shown in FIG. 7, the moving speed is limited until there is no obstacle within the safe range (Step S15). Then, the processing of Steps S14 to S16 is repeated until the safety of the safety range is confirmed by the distance sensor group 24 (Step S17). In response to the confirmation in Step S17 that the safety range of the distance sensor group 24 is safe, the autonomous mobile apparatus control system according to the second embodiment recovers the autonomous transport robot 20 to the autonomous drive mode (Step S18).

From the above description, in the second embodiment, the autonomous transport robot 20 determines the moving direction of the autonomous transport robot 20 for recovering to the autonomous drive mode from the stuck state and controls the movement based on the information acquired from the higher-level management apparatus 10. As described above, the determination of the moving direction and the movement control of the autonomous transport robot 20 for recovering from the stuck state to the autonomous drive mode can be performed by the higher-level management apparatus 10 or by the autonomous transport robot 20. At this time, the autonomous transport robot 20 determines the moving direction and the movement control of the autonomous transport robot 20 based on the environmental information acquired by the higher-level management apparatus 10 using the environment cameras 30. By doing so, it is possible to recover the autonomous transport robot 20 to the safe autonomous drive mode in a manner similar to the first embodiment.

Third Embodiment

In a third embodiment, another form of the method for recovering from the autonomous cancel mode to the autonomous drive mode will be described. In the description of the third embodiment, components described in the first and second embodiments are denoted by the same reference signs as those of the first and second embodiments, and description of those components is omitted.

Figure 8:
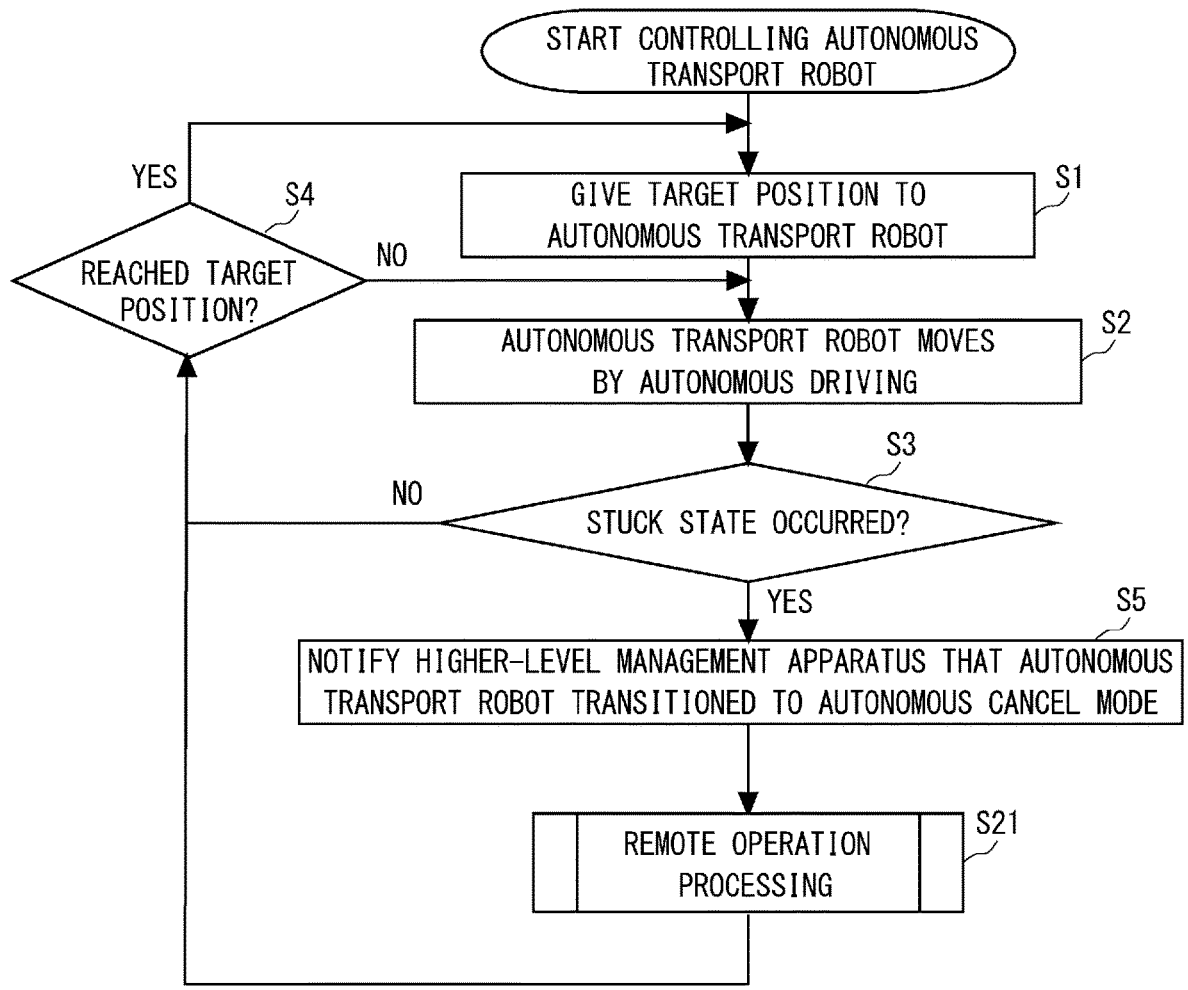
FIG. 8 is a flowchart for explaining the operation of the autonomous mobile apparatus control system according to a third embodiment.

In the third embodiment, the recovery from the stuck state shown in FIGS. 5 and 6 in the second embodiment will be described. FIG. 8 is a flowchart for explaining an operation of an autonomous mobile apparatus control system according to the third embodiment. As shown in FIG. 8, the control of the autonomous mobile apparatus control system according to the third embodiment is different from that according to the first embodiment in that remote operation processing (Step S21) is performed in the control of the autonomous mobile apparatus control system according to the third embodiment instead of the processing after the processing of Step S5 described in FIG. 4. That is, in the control of the autonomous transport robot 20 according to the first embodiment, the higher-level management apparatus 10 only instructs the moving direction of the autonomous transport robot 20 at the initial stage of recovery, whereas in the control of the autonomous transport robot 20 according to the third embodiment, the higher-level management apparatus 10 controls the autonomous transport robot 20 until it becomes completely recoverable.

Figure 9:
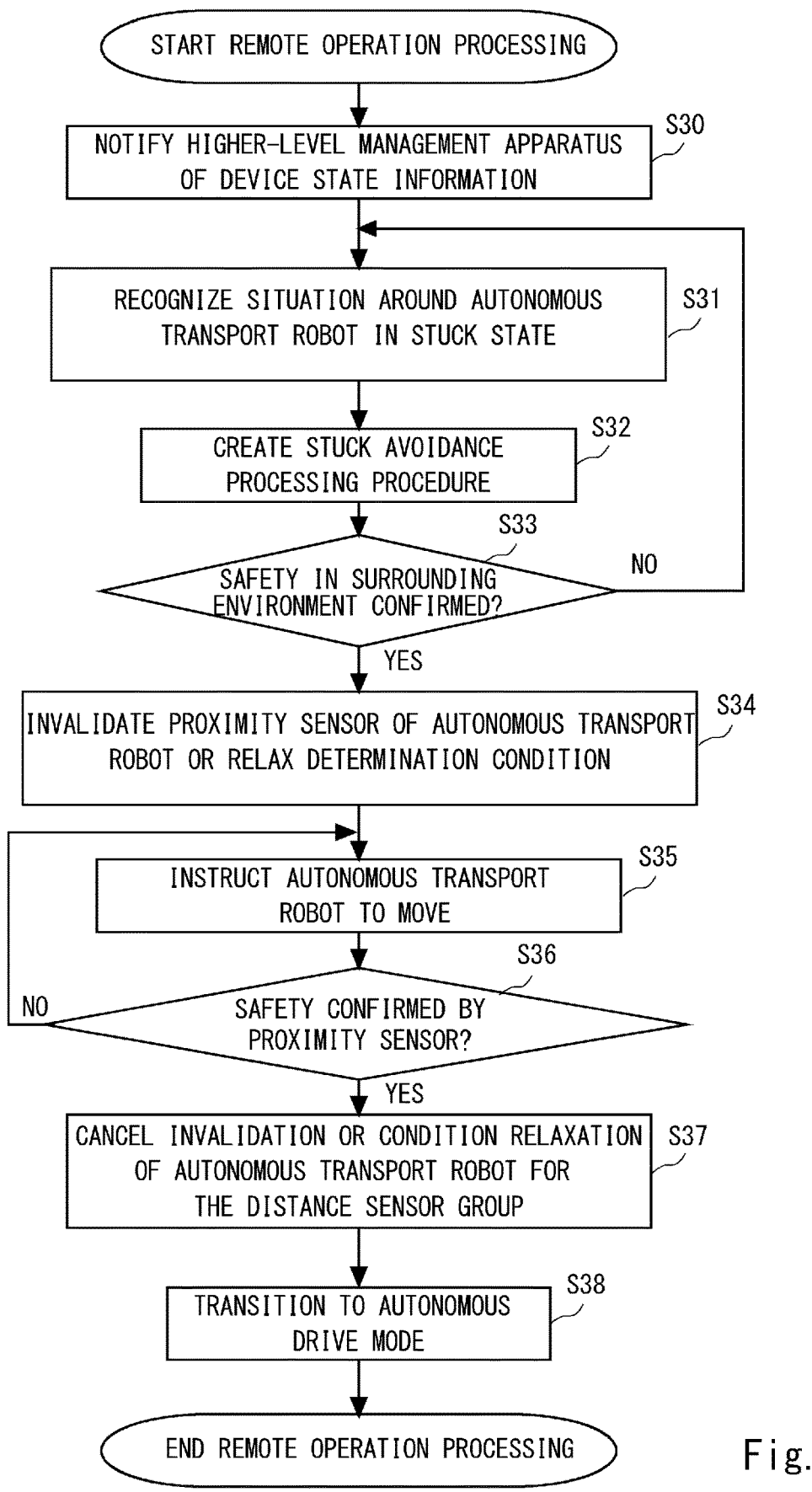
FIG. 9 is a flowchart for explaining an operation of remote operation processing of the autonomous mobile apparatus control system according to the third embodiment.

The details of Step S21 will now be described. FIG. 9 is a flowchart for explaining the operation of the remote operation processing of the autonomous mobile apparatus control system according to the third embodiment. As shown in FIG. 9, in the control method according to the third embodiment, the autonomous transport robot 20 in the stuck state notifies the higher-level management apparatus 10 of device state information (Step S30). The device state information includes, for example, the distance information acquired by the distance sensor group 24, the position of the autonomous transport robot 20 acquired by the camera 25, and error information.

Then, the higher-level management apparatus 10, which has acquired the device state information, uses the environment cameras 30 to recognize the surrounding environment of the autonomous transport robot 20 in the stuck state (Step S31). Next, the higher-level management apparatus 10, in the stuck avoidance processing procedure generation unit 112 creates the stuck avoidance procedure for preventing the autonomous transport robot 20 from being stuck based on the information acquired in Steps S30 and S31 (Step S32). The higher-level management apparatus 10 repeats the processing of Steps S31 and S32 until the safety around the autonomous transport robot 20 can be confirmed based on the information acquired from the environment cameras 30 (Step S33). Then, in Step S33, in response to the confirmation of the safety around the autonomous transport robot 20, the higher-level management apparatus 10 starts the processing from Step S33 onwards. In Step S34, the robot control unit 111 of the higher-level management apparatus 10 invalidates the determination of the distance information acquired from the distance sensor group 24 of the autonomous transport robot 20 or relaxes the determination condition (Step S34). In the state of Step S34, the operation of the autonomous transport robot 20 is under the control of the higher-level management apparatus 10, and the autonomous transport robot 20 does not limit the operation based on the information independently acquired from the distance sensor group 24.

Next, the higher-level management apparatus 10 gives an operation instruction to the autonomous transport robot 20 in accordance with the stuck avoidance processing procedure created in Step S32, and moves the autonomous transport robot 20 (Step S35). The higher-level management apparatus 10 performs the processing of Step S35 until the safety of the autonomous transport robot 20 within the safety range is confirmed based on the distance information acquired from the distance sensor group 24 of the autonomous transport robot 20 (Step S36). In response to the confirmation in Step S36 of the safety in the safety range of the autonomous transport robot 20, the higher-level management apparatus 10 cancels the invalidation or condition relaxation of the autonomous transport robot 20 for the distance sensor group 24 (Step S37), and controls the autonomous transport robot 20 to transition to the autonomous drive mode (Step S38).

As described above, in the third embodiment, the autonomous transport robot 20 in the stuck state is controlled by the higher-level management apparatus 10 until the safety within the safety range is confirmed. Thus, in the autonomous mobile apparatus control system according to the third embodiment, the processing load of the autonomous transport robot 20 can be reduced as compared with that according to the other embodiments.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous mobile apparatus control system comprising:
    an autonomous mobile robot having on-board the autonomous mobile robot: (i) a plurality of sensors including a proximity sensor configured to detect a distance between the autonomous mobile robot and an object around the autonomous mobile robot, (ii) a memory storing map data, and (iii) a processor that controls the autonomous mobile robot to travel autonomously using outputs of the sensors and the map data;
    a higher-level management apparatus that is separate from the autonomous mobile robot and that is configured to manage the autonomous mobile robot; and
    a plurality of environment cameras that are separate from the autonomous mobile robot and that are provided at locations in an environment in which the autonomous mobile robot operates, the plurality of environment cameras configured to photograph a moving range of the autonomous mobile robot and transmit a photographed image to the higher-level management apparatus, wherein
    the processor of the autonomous mobile robot is configured to:
        acquire a movement target position from the higher-level management apparatus, and control the autonomous mobile robot to autonomously move toward the movement target position; and
        when the autonomous mobile robot enters a stuck state in which the autonomous mobile robot cannot autonomously move, transmit an autonomous cancel notification for notifying the higher-level management apparatus that the autonomous mobile robot cannot autonomously move; and
    after the transmission of the autonomous cancel notification:
        the higher-level management apparatus is configured to determine, based on information acquired from at least one of the plurality of environment cameras, whether or not the autonomous mobile robot can avoid an obstacle that has caused the autonomous mobile robot to enter the stuck state,
        the higher-level management apparatus is configured to notify, when the higher-level management apparatus has determined that the autonomous mobile robot can avoid the obstacle, the autonomous mobile robot that the autonomous mobile robot can avoid the obstacle,
        the processor of the autonomous mobile robot is configured to request the higher-level management apparatus to supply the environmental information around the autonomous mobile robot to the autonomous mobile robot in response to the higher-level management apparatus notifying that the autonomous mobile robot can avoid the obstacle, the environmental information including image information which is photographed by the plurality of environment cameras and that enables recognition of the situation around the autonomous mobile robot, and
        the processor of the autonomous mobile robot is configured to determine a moving direction of the autonomous mobile robot and control the movement of the autonomous mobile robot based on the environmental information acquired from the higher-level management apparatus, which causes the autonomous mobile robot to recover to the autonomous drive mode.

2. The autonomous mobile apparatus control system according to claim 1, wherein the autonomous mobile robot enters the stuck state when the proximity sensor determines that there is the obstacle in a safety range set around the autonomous mobile robot.

3. A method of controlling an autonomous mobile apparatus control system comprising:
    an autonomous mobile robot having on-board the autonomous mobile robot: (i) a plurality of sensors including a proximity sensor configured to detect a distance between the autonomous mobile robot and an object around the autonomous mobile robot, (ii) a memory storing map data, and (iii) a processor that controls the autonomous mobile robot to travel autonomously using outputs of the sensors and the map data;
    a higher-level management apparatus that is separate from the autonomous mobile robot and that is configured to manage the autonomous mobile robot; and
    a plurality of environment cameras that are separate from the autonomous mobile robot and that are provided at locations in an environment in which the autonomous mobile robot operates, the plurality of environment cameras configured to photograph a moving range of the autonomous mobile robot and transmit a photographed image to the higher-level management apparatus, the method comprising:
    the processor of the autonomous mobile robot controlling the autonomous mobile robot to acquire a movement target position from the higher-level management apparatus, and the processor controlling the autonomous mobile robot to autonomously move toward the movement target position;
    when the autonomous mobile robot enters a stuck state in which the autonomous mobile robot cannot autonomously move, the processor of the autonomous mobile robot controlling the autonomous mobile robot to transmit an autonomous cancel notification to the higher-level management apparatus for notifying the higher-level management apparatus that the autonomous mobile robot cannot autonomously move;
after the transmission of the autonomous cancel notification:
  the higher-level management apparatus determining, based on information acquired from at least one of the plurality of environment cameras, whether or not the autonomous mobile robot can avoid an obstacle that has caused the autonomous mobile robot to enter the stuck state;
  the higher-level management apparatus notifying, when the higher-level management apparatus has determined that the autonomous mobile robot can avoid the obstacle, the autonomous mobile robot that the autonomous mobile robot can avoid the obstacle;
  the processor of the autonomous mobile robot requesting the higher-level management apparatus to supply the environmental information around the autonomous mobile robot to the autonomous mobile robot in response to the higher-level management apparatus notifying that the autonomous mobile robot can avoid the obstacle, the environmental information including image information which is photographed by the plurality of environment cameras and that enables recognition of the situation around the autonomous mobile robot; and
  the processor of the autonomous mobile robot determining a moving direction of the autonomous mobile robot and controlling the movement of the autonomous mobile robot based on the environmental information acquired from the higher-level management apparatus, which causes the autonomous mobile robot to recover to the autonomous drive mode.

4. A non-transitory computer readable medium control program of an autonomous mobile robot executed by a higher-level management apparatus in an autonomous mobile apparatus control system comprising:
  an autonomous mobile robot having on-board the autonomous mobile robot: (i) a plurality of sensors including a proximity sensor configured to detect a distance between the autonomous mobile robot and an object around the autonomous mobile robot, (ii) a memory storing map data, and (iii) a processor that controls the autonomous mobile robot to travel autonomously using outputs of the sensors and the map data;
  a higher-level management apparatus that is separate from the autonomous mobile robot and that is configured to manage the autonomous mobile robot; and
  a plurality of environment cameras that are separate from the autonomous mobile robot and that are provided at locations in an environment in which the autonomous mobile robot operates, the plurality of environment cameras configured to photograph a moving range of the autonomous mobile robot and transmit a photographed image to the higher-level management apparatus, the control program:
  causes the processor of the autonomous mobile robot to acquire a movement target position from the higher-level management apparatus, and causes the processor to control the autonomous mobile robot to autonomously move toward the movement target position;
  when the autonomous mobile robot enters a stuck state in which the autonomous mobile robot cannot autonomously move, causes the processor of the autonomous mobile robot to transmit an autonomous cancel notification to the higher-level management apparatus for notifying the higher-level management apparatus that the autonomous mobile robot cannot autonomously move;
  causes the higher-level management apparatus to determine, in response to receiving the autonomous cancel notification, whether or not the autonomous mobile robot can avoid an obstacle that has caused the autonomous mobile robot to enter the stuck state based on information acquired from at least one of the plurality of environment cameras;
  causes the higher-level management apparatus to notify, when the higher-level management apparatus has determined that the autonomous mobile robot can avoid the obstacle, the autonomous mobile robot that the autonomous mobile robot can avoid the obstacle;
  causes the processor of the autonomous mobile robot to request the higher-level management apparatus to supply the environmental information around the autonomous mobile robot to the autonomous mobile robot in response to the higher-level management apparatus notifying that the autonomous mobile robot can avoid the obstacle, the environmental information including image information which is photographed by the plurality of environment cameras and that enables recognition of the situation around the autonomous mobile robot; and
  causes the processor of the autonomous mobile robot to determine a moving direction of the autonomous mobile robot and to control the movement of the autonomous mobile robot based on the environmental information acquired from the higher-level management apparatus, which causes the autonomous mobile robot to recover to the autonomous drive mode.

* * * * *